Sept. 5, 1950 W. GRIFFITHS 2,521,631
CROSSROW CULTIVATOR FOR TRACTORS
Filed May 22, 1946 3 Sheets-Sheet 1
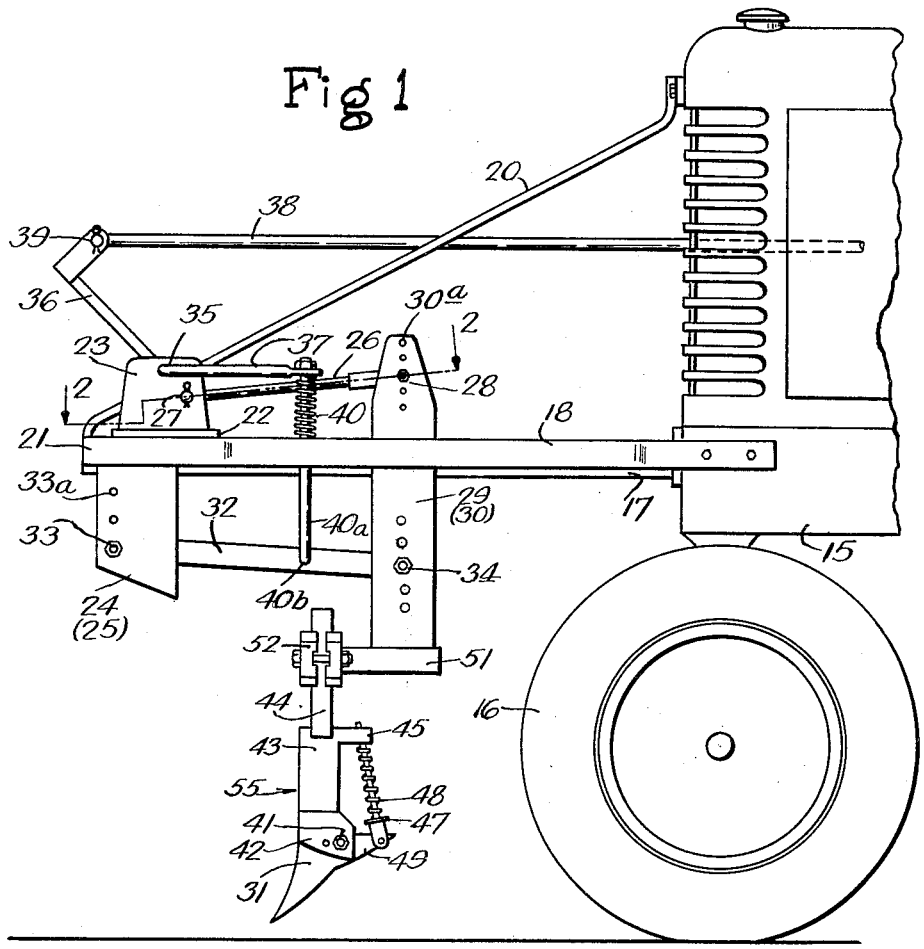
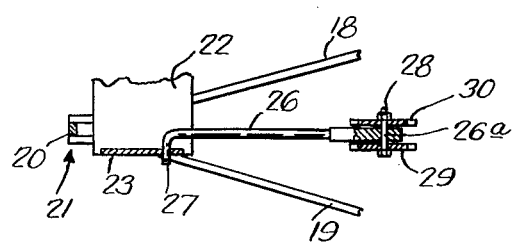
WILLIAM GRIFFITHS
INVENTOR.
BY
Wilfred E. Lawson Sept. 5, 1950 W. GRIFFITHS 2,521,631
CROSSROW CULTIVATOR FOR TRACTORS
Filed May 22, 1946 3 Sheets-Sheet 2
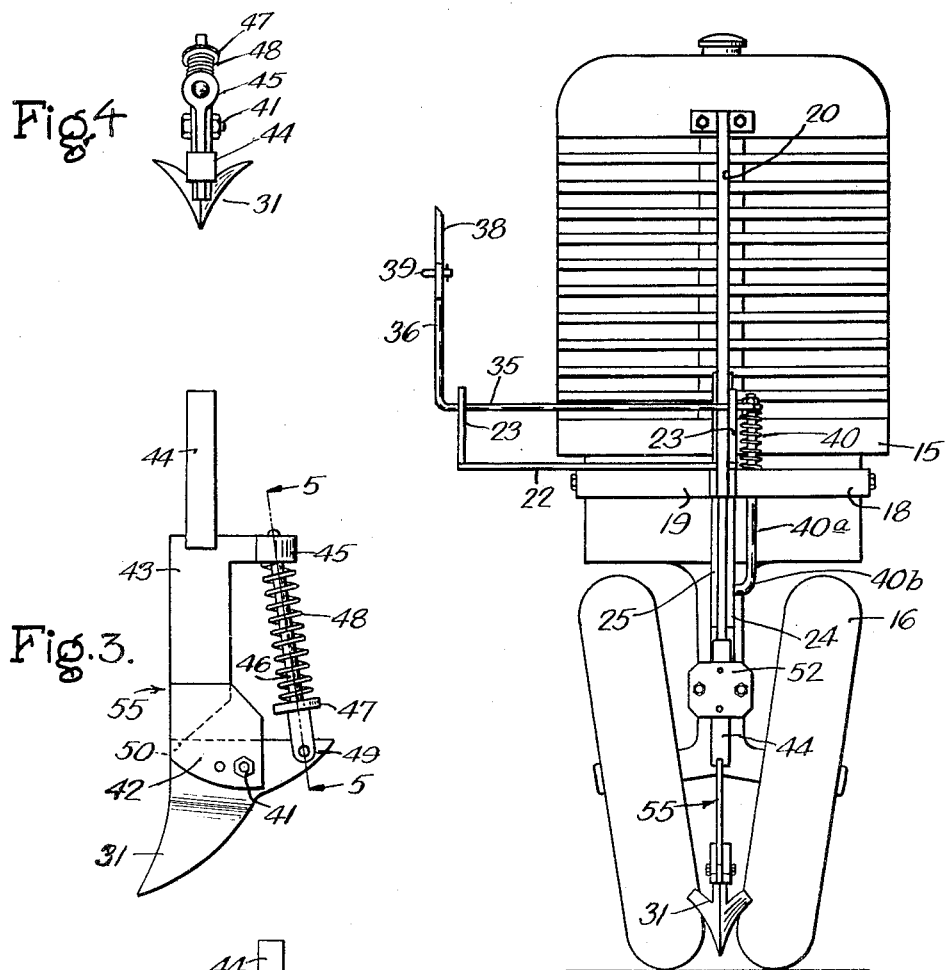
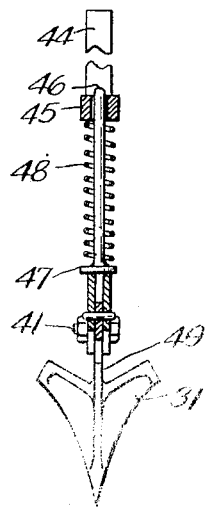
WILLIAM GRIFFITHS
INVENTOR.
BY Wilfred E. Lawson

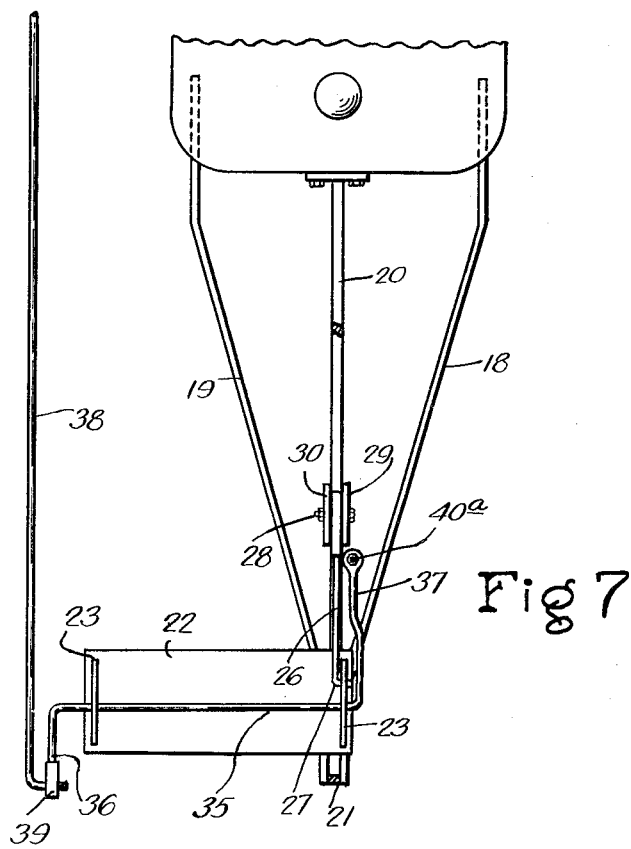
Fig 7
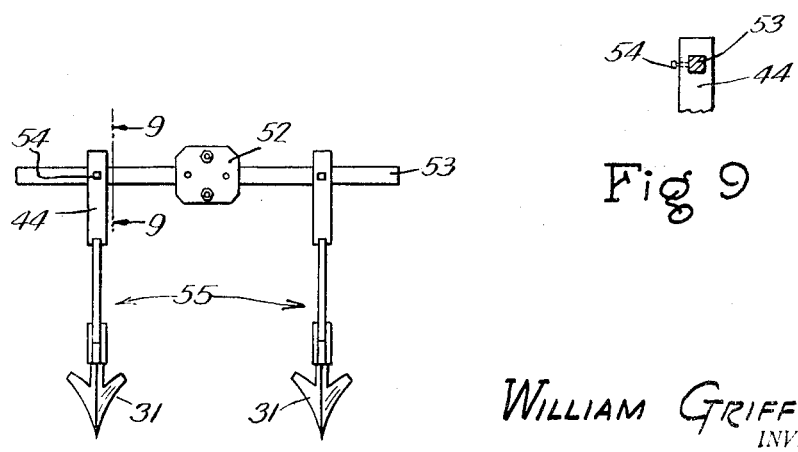
Fig 9
Fig 8
WILLIAM GRIFFITHS
INVENTOR.
BY
Wilfred E Lawson Patented Sept. 5, 1950

2,521,631

UNITED STATES PATENT OFFICE 2,521,631

CROSSROW CULTIVATOR FOR TRACTORS

William Griffiths, Mazon, Ill.

Application May 22, 1946, Serial No. 671,612

1 Claim. (Cl. 37—181)

This invention relates to an attachment for cultivators for cross row plowing. The purpose of the invention is to smooth out the hills on ground which have been produced by the first cultivation for row crops, such as corn, beans, peas and others.

In ordinary cross row cultivation, the previously produced ground hills cause the tractor to jump when passing each hill or row, which makes riding very rough. My cultivator device overcomes this jumping because of the fact that it smooths out the ground hills in advance of the tractor, so that the tractor wheels can pass over level ground, making driving smoother. My cultivator attachment works independent of the tractor steering wheels, thereby making steering and riding much easier and is rigidly attached preventing "plugging" of the front wheels of the tractor which now will run on level ground.

These and other objects and advantages of this invention will be better understood from the following description with the aid of the attached drawings, which form part of this application.

In the drawings, showing one embodiment of the invention:

Figure 1 is a view in side elevation of the cultivator attachment as fastened on the front end of a tractor;

Figure 2 is a fractional plan view in section taken on a plane along line 2—2 of Figure 1;

Figure 3 is a side elevational view of the shovel unit;

Figure 4 is a top plan view of the shovel unit in Figure 3;

Figure 5 is a sectional view taken along line 5—5 of Figure 3;

Figure 6 is a view in front elevation of Figure 1 with narrow gauge front wheels and a single shovel or plowshare;

Figure 7 is a top plan view of Figure 1;

Figure 8 is a front view of a bar attachment for a wide gauge tractor and two shovels; and Figure 9 is a fragmentary view in section taken along line 9—9 of Figure 8.

Like numerals indicate the same details in the different views of the drawings.

The front end of a tractor is indicated by numeral 15, supported in usual manner on narrow gauge front or steering wheels 16, the steering action being entirely independent of the operation of the cross row attachment.

The cross row cultivator device consists of a rigid bracket construction including a central horizontal bar 17, two side braces 18, 19 and an inclined middle brace 20 all secured as by bolts or rivets on the front and side faces of the radiator end of a tractor 15. These bracket members 17, 18, 19 and 20 are all joined and secured together at a forward point at 21, thereby providing a stiff bracket structure on the radiator front end of the tractor 15.

On top of this fixed bracket structure 17, 18, 19, 20 is welded a horizontal plate 22 and two vertical plates 23, one at each end thereof, and beneath that structure is similarly welded, at the point 21, a pair of spaced apart hinge plates 24, 25. The numeral 26 designates a rocking arm which has a right angularly turned end portion 27 which passes horizontally through the plate 23. From the rear end of the rocking arm 26 is suspended, on a cross bolt 28 passing through an eye 26a, a pair of shovel supporting plates 29, 30, one on each side of the bolt eye 26a. These supporting plates extend downwardly for carrying the plowshare or shovel 31 with its clamping unit 55. For up and down adjustment of the supporting plates 29, 30 on the hinge bolt 28, a series of bolt holes 30a is provided, in a vertical line, in said plates.

In order to provide a substantially vertical rocking motion of plates 29, 30, a second rocking arm 32 is provided, carried between two hinge pins 33 and 34 in plates 24, 25 and 29, 30, respectively. A series of vertically arranged holes 33a for the rocking arm 32 is similarly provided in plates 24, 25.

In the spaced-apart upright plates 23 is mounted, to oscillate, a transverse crank shaft 35 with a forward lever 36 at one end, and rearward lever 37 at the other end. This crank shaft 35 is under control of an operating rod 38, which is pivoted at 39 and extends rearwardly for convenient manipulation by the tractor driver or for mechanical power lift. Between the rear end of lever 37 and the nose portion 21 of the fixed bracket is inserted a compression spring 40 carried around a suspension rod 40a hung from the said lever 37 and pivoted at 40b to the rocking arm 32 for normally supporting the weight of the shovel 31 with its clamping unit.

The plowshare or shovel 31 with the usual flared wings is carried to oscillate on a pin 41 between two spaced bearing plates 42 which are welded to the lower end of a spring supporting block 43 having an upward bar extension 44 also welded thereto, so that parts 42, 43, 44 form a rigid structure. Between a rearward eye 45 on the block 43, around a rod 46 sliding therein and a collar 47 on said rod, is inserted a compression spring 48, the end of the rod 46 having hinge connection with a tailpiece 49 on the shovel 31. By this means the shovel can be tripped against the spring action to yield, when meeting an obstruction on the ground. Normally, the shovel is held by the spring 48 as seen in Figure 3, against an abutment 50 on the block 43. These elements 31, 41 through 50, constitute the shovel unit 55.

The upright bar 44 on the plow block 43 is secured on a metal band 51 at the bottom end of the plates 29, 30 by a pair of clamping plates 52.

Instead of a single shovel 31, two may be carried, as in Figure 8, on a cross bar 53 and secured on the band 51 by means of the clamping plates 52. This mode is preferably employed for broad gauge tractors. The two shovel units are the same as for narrow gauge tractors with the difference that both units are secured on the cross bar 53 with adjustable spacing by set screws 54 abutting against the cross bar 53, which in turn is carried on the band 51 at the lower end of the supporting plates 29, 30 by clamping plates 52.

It is to be understood that the invention as hereindisclosed may be varied from the details described and shown without departure from the spirit of the subjoined claim.

I claim:

An earth working attachment for tractors, comprising a pair of forwardly converging members having their rear ends secured to opposite sides of the front end of the tractor, a bracket of U-form extending laterally from the forward ends of said members to a point beyond the adjacent side of the tractor, a shaft journalled in the legs of said bracket, a crank at the outer end of said shaft, an arm extending at right angles to and from the other end of said shaft, a second bracket depending from the lower sides of said members below the first bracket, a second arm pivoted at one end to said second bracket and extending rearwardly therefrom, a pair of vertically disposed plates centered between said members, said second arm having its other end pivoted to and between said plates below said members, a third arm pivoted at one end to the inner leg of the first bracket and having its other end pivoted to and between said plates above said members, a rod depending from the first arm and pivotally connected to said second arm intermediate the ends thereof, an open spiral spring encircling the upper portion of said rod and adapted to be compressed on a downward movement of the first arm and the rod, a mounting on the lower ends of said plates for an earth working means, and means operatively connected with said crank and extending rearwardly therefrom alongside the tractor for manipulation by the operator of the tractor to affect the raising and lowering of said earth working means.

WILLIAM GRIFFITHS.

REFERENCES CITED

The following references are of record in the file of this patent:

UNITED STATES PATENTS

| Number | Name | Date |
|---|---|---|
| 1,041,975 | Dennis | Oct. 22, 1912 |
| 1,068,863 | Dugger | July 29, 1913 |
| 2,099,637 | Wendel | Nov. 16, 1937 |
| 2,163,682 | Heeren | June 27, 1939 |
| 2,179,793 | Lewison | Nov. 14, 1939 |
| 2,228,490 | Smith | Jan. 14, 1941 |
| 2,277,880 | Noble | Mar. 31, 1942 |
| 2,282,367 | Koistinen | May 12, 1942 |